United States Patent
Krey et al.

(10) Patent No.: US 7,422,434 B1
(45) Date of Patent: Sep. 9, 2008

(54) PERSONALIZED STORY READING APPARATUS

(76) Inventors: Adam Krey, 622 Pond View Dr., Mendota Heights, MN (US) 55120;
Peter Eisenhuth, 612 Pond View Ct., Mendota Heights, MN (US) 55120;
Claudia Eisenhuth, 612 Pond View Ct., Mendota Heights, MN (US) 55120

( * ) Notice: Subject to any disclaimer, the term of this patent is extended or adjusted under 35 U.S.C. 154(b) by 570 days.

(21) Appl. No.: 11/182,322

(22) Filed: Jul. 18, 2005

(51) Int. Cl.
*G09B 17/00* (2006.01)
(52) U.S. Cl. ...................................... 434/178
(58) Field of Classification Search ............... 434/178, 434/185, 308, 309, 317, 318, 320; 40/417
See application file for complete search history.

(56) References Cited

U.S. PATENT DOCUMENTS

| | | | | |
|---|---|---|---|---|
| 4,391,053 A | * | 7/1983 | Anthony | 40/745 |
| 4,541,188 A | * | 9/1985 | Sadorus | 40/717 |
| 4,996,681 A | * | 2/1991 | Cocco et al. | 369/273 |
| 5,359,374 A | * | 10/1994 | Schwartz | 40/455 |
| 5,365,686 A | * | 11/1994 | Scott | 40/455 |
| 5,520,544 A | * | 5/1996 | Manico et al. | 434/317 |
| 5,794,371 A | * | 8/1998 | Camillery | 40/717 |
| 5,890,603 A | * | 4/1999 | Arguin et al. | 211/45 |
| 6,003,901 A | * | 12/1999 | Takemura | 281/33 |
| 6,163,997 A | * | 12/2000 | Deralas | 40/745 |
| 6,185,851 B1 | * | 2/2001 | Loudermilk et al. | 40/717 |
| 6,427,370 B1 | * | 8/2002 | Smith | 40/717 |
| 6,591,526 B1 | * | 7/2003 | Garrett | 40/455 |
| 6,975,832 B2 | * | 12/2005 | Adams et al. | 434/317 |
| 2002/0175513 A1 | * | 11/2002 | Li | 281/22 |
| 2004/0128894 A1 | * | 7/2004 | Sachs-Lavery | 40/741 |

* cited by examiner

*Primary Examiner*—Kurt Fernstrom
(74) *Attorney, Agent, or Firm*—Thomas B. Tate

(57) ABSTRACT

A personalized story reading apparatus. The apparatus includes a book holder, a picture holder, and a voice recorder. A person, for example, a parent or a grandparent, records his or her voice reading the book and places his or her photograph into the picture holder. In this way the parent or grandparent can read the story to his or her child or grandchild even if he or she is not physically present.

1 Claim, 4 Drawing Sheets

PERSONALIZED STORY READING APPARATUS

BACKGROUND OF THE INVENTION

The field of the invention is combinations of picture holders, book holders, and voice recorders.

It has long been known that reading story books to children is a good way to develop a child's interest and skills in reading, as well as a way for parents and other relatives to bond with the child. Unfortunately in today's society it is not always possible to read stories it children in person. Parents may have jobs that require frequent out-of-town business trips, and grandparents or other relatives may live far away and thus be able to visit only occasionally. The parent invention is designed to help people in these situations simulate a personalized reading experience for their children or grandchildren. As the child pages through a book, he or she hears the recorded voice of a parent or other relative reading the book and can see said relative's picture in the picture holder.

Various prior art devices combining a picture frame with a voice recorder are known to exist. One type currently on the market, known by the trademark Voice-Over, is manufactured by Voice Express Corp., Tuckahoe, New York, and is described in several U.S. patents to Loudermilk et al., most comprehensively in U.S. Pat. No. 6,393,401.

Other types of combination picture frames and recorders are described in the following U.S. Pat. No. 5,365,686 to Scott, U.S. Pat. No. 5,359,374 to Schwartz, U.S. Pat. No. 6,427,370 to Smith, and U.S. Pat. No. 5,794,371 to Camillery, as well as the following design patents: D490,990 to Li, D435,841 to Thousand, D457,530 to Amron, and D437,590 to Girt et al.

Talking boots are also known in the prior art. However, no known prior art combines a picture holder, a book holder, and a voice recorder to make a complete personalized story reading system as in the present invention.

SUMMARY OF THE INVENTION

The personalized story reading apparatus can be made in a reusable version or in a permanent version.

In the reusable version, the book holder could be a clip-on type so that different books could be inserted into the book holder. The voice recorder would have more digital memory so that different books could be recorded. This version is especially suitable for parents who wish to record stories to be read to their children while the parents are out of town.

In the permanent version, the book holder could be attached to the book by an adhesive, or the picture holder and voice recorder could be built into the back cover of the book. This version is especially suitable for grandparents who wish to give their grandchildren a gift of a book with the recording of the grandparents reading the story.

DETAILED DESCRIPTION OF THE INVENTION

Figure 1:
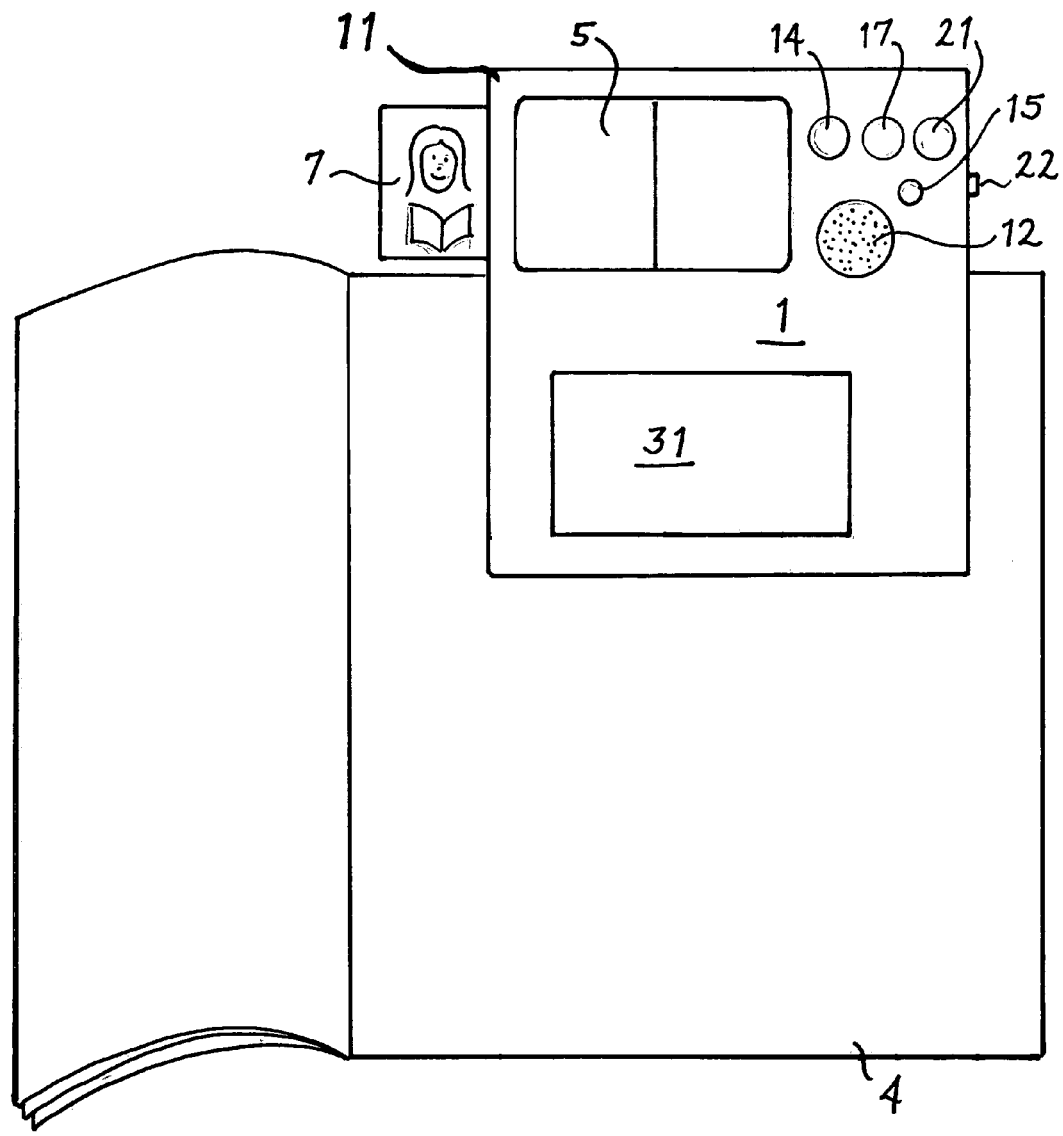
FIG. 1 is a front view of the reusable embodiment of the invention.
Figure 2:
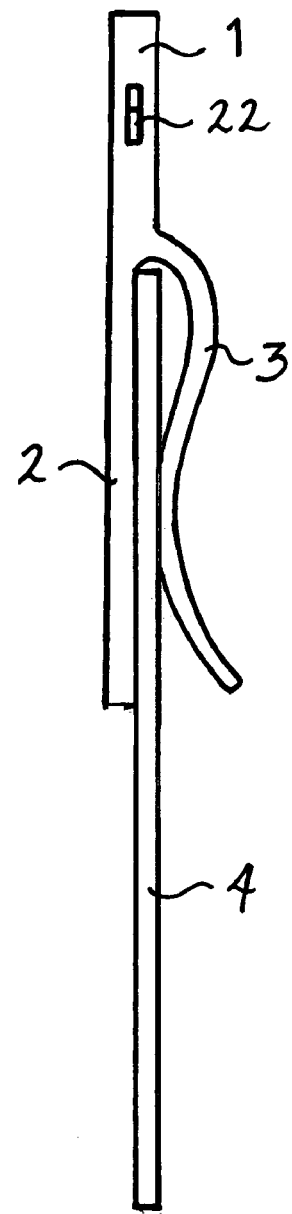
FIG. 2 is a side view of the reusable embodiment of the invention.
Figure 3:
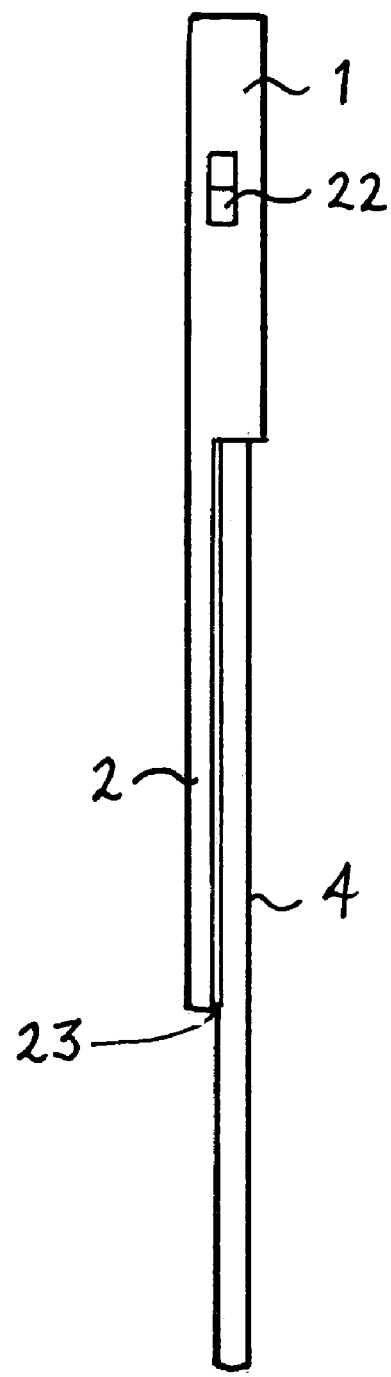
FIG. 3 is a side view of one permanent embodiment of the invention.
Figure 4:
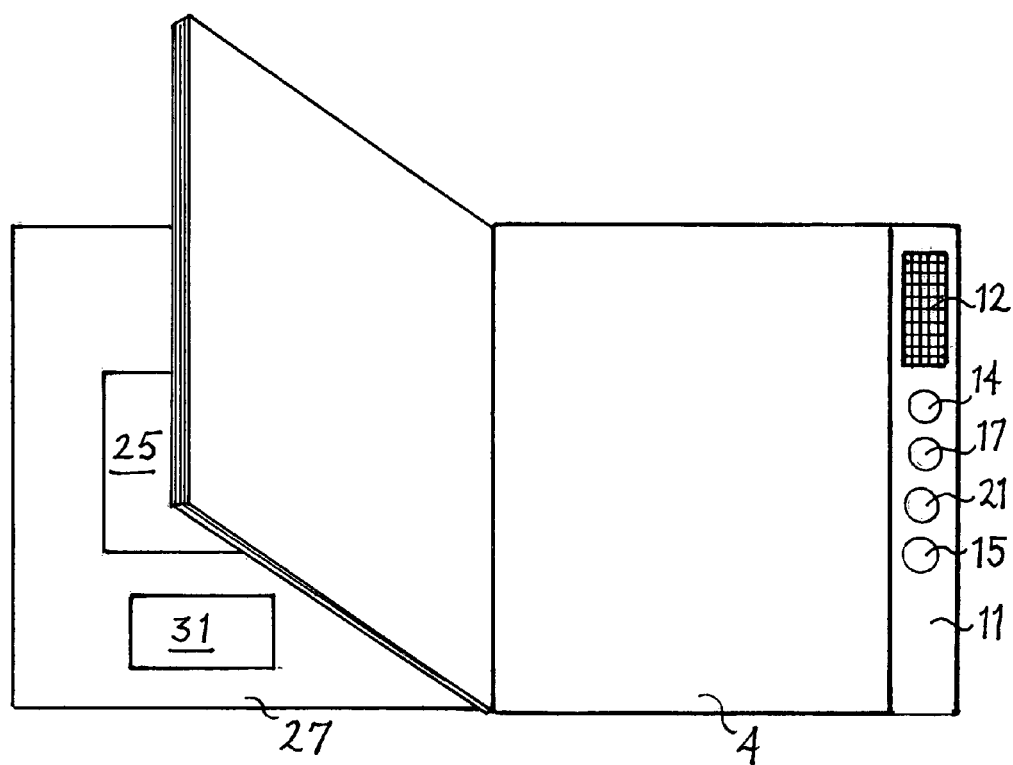
FIG. 4 is a back open book view of another permanent embodiment of the invention.

The preferred embodiment of the invention is the version in which the book, photograph, and recording are interchangeable so that the same device can be reused to record different books as needed.

In this version, the book holder means is a clear (transparent) plastic frame 1. Partway down from the top the frame 1 bifurcates into a front panel 2 and a curved clasp 3. The clasp 3 may be an integral plastic part at the back of the frame 1, or the clasp 3 may be metal and fused into the back surface of the frame 1. The flex point is at the point of attachment, so that the clasp 3 springs outward at the bottom to allow the book cover 4 of an open book to be inserted between the clasp 3 and the back surface of the front panel 2 of the frame 1, and snaps back to hold the book cover 4 in position between the back surface of the front panel 2 and the most inwardly curved part of the clasp 3.

The picture holder means is a generally rectangular slot 5 formed into the frame 1 near its top end (above the point where the frame 1 bifurcates into front panel 2 and clasp 3). A photograph 7 of the person who will be recording his or her reading of the story can be removeably slid into the slot 5 so that it is visible through the front surface of the frame 1.

The voice recorder means is any type of conventional digital voice recorder 11 that has a speaker/microphone 12, play 14, record 15, stop 17, and rewind 21 buttons, and preferably a lock button 22. The recorder 11 is preferably either built into the frame 1 or mounted on the back of the frame 1 flush across the top, but may be mounted on the front of the frame 1.

To use this version of the personalized story reading apparatus, the person reading the story records his or her voice doing the reading and inserts his or her photograph 7 into the slot 5 in the frame 1. The person to whom the story is being read can insert the book cover 4 into the frame 1 and press the play button 14 on the voice recorder 11, and can follow along, looking at words and illustrations in the book, as the recorded story is read to him or her. More than one story can be recorded into the digital memory of the recorder 11 or the tape can be erased and a new story recorded, so that different books can be inserted into the frame 1 and be read to a child or other listener as desired. The photo 7 can also be changed if a different person is reading the next story.

In the version for permanent recording of one story, there are two alternative embodiments. One of these embodiments is similar to the reusable version, except for the method of attachment. This permanent version has, instead of the clip 3, an adhesive 23 on the lower back surface of the frame 1 to which the back cover 4 of the book is affixed (initially covered by peel-off plastic), or alternatively, hook and loop fasteners (known by the trademark Velcro) on the lower back surface of the frame 1 and on the back cover 4 of the book meet for semi-permanent attachment. An alternative embodiment has the voice recorder means 11 built into the back cover 4 of the book (and extending beyond the edges of the back cover 4) and has a plastic sleeve 25 formed into the front cover 27 of the book to serve as the picture holder means.

A personalized label 31 may be placed onto the front panel 2 of the frame 1 in the first and second versions of the invention described herein, or on the front cover 27 of the book in the third version of the invention described herein.

We claim:

1. A personalized story reading apparatus, said apparatus comprising:

a transparent frame that serves as a combination book holder and picture holder, said frame having a generally rectangular slot formed into said frame near the top end of said frame, said slot allowing a photograph to be removeably inserted therein so that said photograph is visible through the front surface of said frame, said frame being bifurcated into a front panel and a curved clasp below said slot, said clasp having its flex point at the point of attachment to said front panel, said clasp curving first outward them inward, and then outward again so that the back cover of an open book can be removeably inserted between said clasp and said front panel and can be held in position securely between the back surface of said front panel and the most inwardly curved part of said clasp;

and a digital voice recorder mounted onto said frame, said voice recorder having a speaker/microphone, a play button, a record button, a stop button, and a rewind button, said recorder having sufficient digital memory that more than one story can be recorded.

* * * * *